Figure 1:
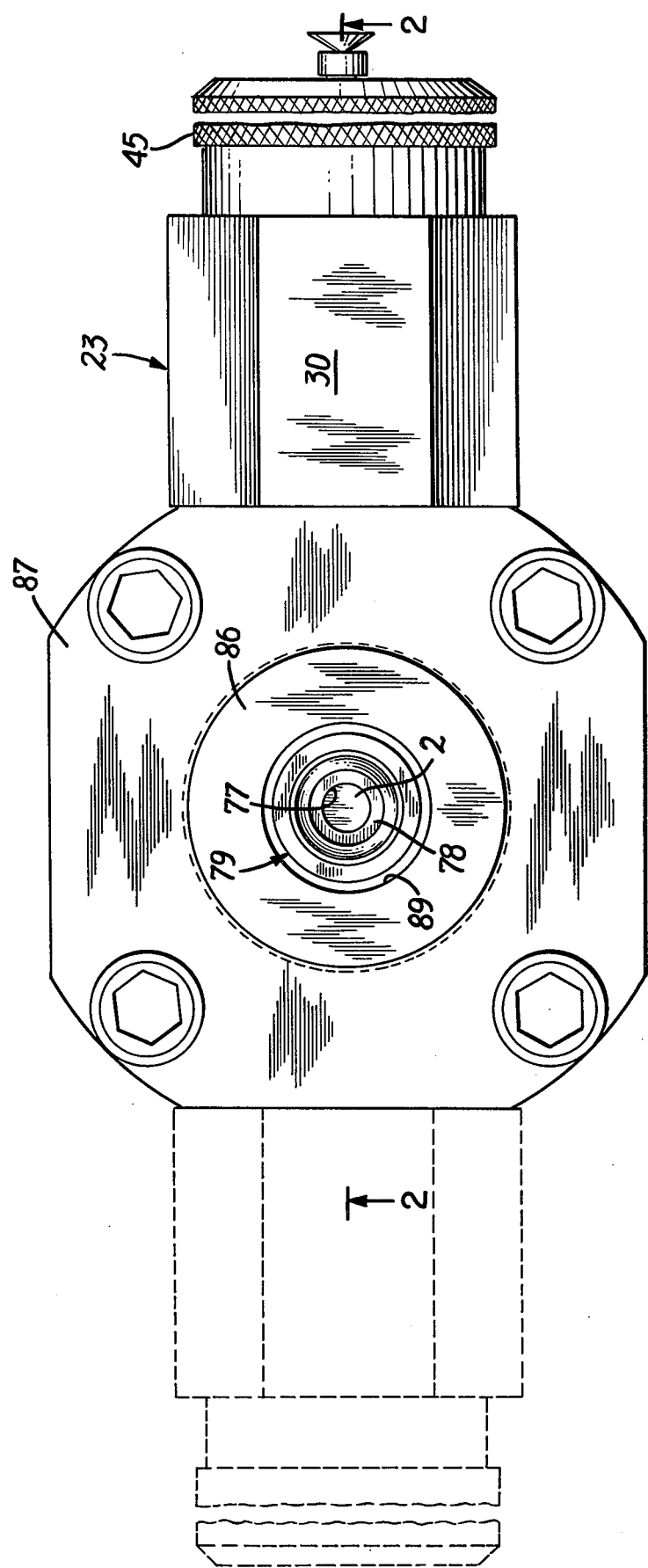

_United States Patent_ [19]

Silverwater

[11] 4,026,153
[45] May 31, 1977

[54] MAGNETIC PRESSURE INDICATOR WITH SAMPLING PORTS

[75] Inventor: Bernard F. Silverwater, Plainview, N.Y.

[73] Assignee: Pall Corporation, Glen Cove, N.Y.

[22] Filed: Aug. 8, 1975

[21] Appl. No.: 602,937

[52] U.S. Cl. .......................... 73/421.5 R; 73/393; 73/420; 116/114 PV; 137/557
[51] Int. Cl.² ................. F17D 3/00; G01N 1/22; G01L 19/12
[58] Field of Search ..... 116/114 PV, 114 K, 117 R; 73/420, 419, 421.5 R, 407 R, 393, 422 R, 423 TC, 421 B, 389, 290 M; 137/557, 329.3

[56] References Cited
UNITED STATES PATENTS

| | | |
|---|---|---|
| 2,012,836 | 8/1935 | Talbot et al. ............... 73/422 R |
| 2,217,855 | 10/1940 | Bassler ....................... 73/422 TC |
| 2,843,077 | 7/1958 | Leefer ......................... 116/117 R |
| 2,942,572 | 6/1960 | Pall ............................. 116/117 R |
| 3,102,427 | 9/1963 | Trostel ......................... 73/39.5 X |
| 3,140,690 | 7/1964 | Siebel ......................... 116/114 PV |
| 3,785,332 | 1/1974 | Silverwater ................ 116/114 PV |
| 3,799,107 | 3/1974 | Sumner ....................... 116/117 R |
| 3,812,816 | 5/1974 | Juhasz ........................ 116/114 PV |

Primary Examiner—Richard C. Queisser
Assistant Examiner—Daniel M. Yasich

[57] ABSTRACT

A magnetic differential pressure indicator is provided for detecting and indicating a pressure differential thereacross that is greater than a predetermined value in a fluid system. The sampling port permits withdrawal of fluid for examination without interference with operation of the indicator.

20 Claims, 2 Drawing Figures

MAGNETIC PRESSURE INDICATOR WITH SAMPLING PORTS

In any system wherein a fluid such as hydraulic fluid or the like is passed through a filter, it is customary to provide means for indicating when the filter element has become loaded, and requires replacement. Since the pressure drop across a filter increases in proportion to the accumulation of contaminants thereon, a suitable indication can be obtained by an indicator actuated when the differential pressure across the filter reaches a predetermined value. Many types of such devices are available, in which the indicating means is actuated mechanically, or electrically, or by other means.

One simple and very successful type of indicating device is the magnetic pressure indicator of U.S. Pat. No. 2,942,572 to David B. Pall. In this device, a first magnetic means is arranged to attract a second magnetic means so long as the two means are separated by less than a predetermined distance. Bias means propels the second magnetic element to an indicating position whenever that distance is exceeded. The first magnetic means is movable with a piston responsive to changes in pressure, and is normally biased towards the second magnetic means by a predetermined force. The second magnetic means is also movable with a piston, and while retained toward the first means by magnetic attraction when close enough thereto, is normally biased in a direction away from the first means by a force capable of overcoming the force of magnetic attraction whenever the first and second means are separated by the predetermined distance.

A particular advantage of the magnetic form of indicator is the sealing off of the second magnetic means from the fluid system, so that leakage is effectively prevented at the indicating mechanism. The second magnetic means can respond to changes of magnetic forces transmitted though the wall sealing if off from the fluid system. The magnitude of the force of magnetic attraction relative to the spring biasing force determines the predetermined pressure differential at which the device is actuated. Thus, the device can be arranged to be actuated at any required differential pressure, by simple adjustment of these forces.

In the usual form of this device, the second magnetic means is arranged to project from the housing after actuation. In another form, the second magnetic means is arranged to give an electric signal upon actuation. In either case, the device can be reset merely by pushing the second magnetic means back toward the first magnetic means, into a position where the magnetic force once again overcomes the spring-biasing force.

Modifications of said improvements in the magnetic differential pressure indicator of U.S. Pat. No. 2,942,572 are shown and described in U.S. Pat. Nos. 3,077,176, patented Feb. 12, 1963, 3,209,721, patented Oct. 5, 1965, 3,140,690, patented July 14, 1964, 3,785,332, patented Jan. 15, 1974, and 3,815,542, patented June 11, 1974.

Frequently, it is desirable in hydraulic systems and like closed-circuit fluid systems to sample the fluid either before or after the differential pressure indicator has been actuated, in order to determine the condition of the fluid. Sampling makes it possible to determine when replacement of the fluid is desirable, for example. Sampling is possible when a sampling port is provided in the fluid line. This requires that the line be readily accessible at the sampling port, and since hydraulic systems and like fluid systems are normally entirely concealed from view, this means running a branch or by-pass line to the sampling location. This can be inconvenient, particularly in aircraft, where space is at a premium and the number of accessible locations is strictly limited.

A magnetic differential pressure indicator is normally positioned in an accessible location, because it is necessary for the indicator to be noted after actuation, and after actuation the indicator must of course be reset. Since the indicating member is entirely sealed off from the fluid line, and the actuating member responsive to differential pressure is in fluid flow connection with two portions of the fluid line, for instance, the upstream side of a filter and the downstream side of a filter, or other device across which the pressure differential is to be sensed, the differential pressure indicator provides an ideal location for sampling of fluid.

In accordance with the invention, one or two sampling ports are provided in the housing for a magnetic differential pressure indicator, of the types described in the above-mentioned patents, for sampling of fluid in the line, either upstream or downstream of the device, as desired. This provides the sampling port at a location which is accessible, avoids the necessity of imposing special fluid sampling ports and lines in the fluid system, with the resulting sealing problems, and at the same time is space-conserving, since one location can be used both for indicating the pressure differential and for sampling.

In accordance with the invention, a magnetic differential pressure indicator is provided with sampling means to permit withdrawal of fluid from the system either upstream or downstream of the indicator, without interference with the actuation of the indicator. The sampling means features a sampling plug which allows sampling of any amount of fluid under system pressure in any orientation of the indicator encountered under service, while allowing movement of the indicating means to its normal indicating position during or after sampling.

The term "magnetic" as used herein encompasses both materials that are permanent magnets and materials that are attracted by magnets, whether permanently or temporarily magnetizable thereby.

The magnetic pressure indicator in accordance with the invention comprises a housing, and, disposed in combination in the housing, a first magnetic means spaced from and arranged to attract or repel a second magnetic means or keeper so long as the two means or the first means and keeper are within their mutual magnetic fields of force, the second magnetic means normally being retained in a first position; first bias means to retain the first magnetic means towards or away from the second magnetic means or keeper, and second bias means to propel the second magnetic means from the first position to an indicating position whenever the spacing between the two magnetic means is changed.

The first magnetic means is movable with or is a first piston, movable in response to changes in pressure, and is normally biased toward or away from the second magnetic means or keeper by a predetermined force.

The housing is provided with at least two fluid line connections for connection for example to different portions of a fluid system, the differential pressure between which is to be detected by the indicator, and of these connections, one leads to one side of the first piston, and another leads to the other side of the first piston. The first piston is movable towards or away from the second magnetic means or keeper in response to line pressure in the two fluid line connections. At least one sampling port is provided in the housing, in fluid flow connection with one of the two fluid line connections. If desired, two sampling ports are provided, one in fluid flow connection with one of the fluid line connections, and the second with the other of the fluid line connections.

The second magnetic means is movable with or is a ball, or a second piston, and is retained toward the first magnetic means or keeper by magnetic attraction, when close enough thereto, but is normally biased in a direction away from the first means or keeper by a force capable of overcoming the force of magnetic attraction to the first means or keeper whenever the first and second magnetic means or keeper are spaced by a predetermined distance.

The first and second magnetic means are each movable, and can be magnets or attracted to magnets. The keeper is stationary, and is positioned therebetween, spacing them by a predetermined distance at least equal to the spacing dimension of the keeper, and can be a magnet or attracted by magnets, so that one at least of the magnetic means is attracted to the keeper. The other can be attracted to the keeper, or other magnetic means, or repelled by the keeper or the other magnetic means.

At least one of the two magnetic means and keeper is a magnet. Preferably, two of these elements (in any combination) are magnets, and if desired, all three can be magnets, but three are not always as advantageous as two. In addition, the keeper can be of nonmagnetic material.

If the keeper is a magnet and the first and second magnetic means are merely attracted thereto, the device functions because the first magnetic means when it moves away from or moves towards the keeper changes the magnetic field between the keeper and the second magnetic means.

The keeper normally serves as the separating wall between the first and second magnetic means, and prevents fluid communication between the spaces within which the first and second magnetic means move. The keeper can be a piece fitted between these spaces, or an integral part of the housing defining such spaces. If the spaces are bores, usually coaxial, the keeper can close off and separate the two parts of the bore from each other, and define a pair of blind bores within which the two magnetic means move.

The first magnetic means moves reciprocally, in response to changes in fluid pressure applied to opposed ends of either the magnetic means or the means on or in which it is carried. Accordingly, it can take any of several forms. It can, for example, be a piston, or part of a piston, as illustrated in the drawings, which can be in the form of a cylinder. The pressure is then applied to the ends of the piston at opposed ends of the cylinder. It can also take the form of a piston or part of a piston of high surface area, such as a flexible disc or diaphragm, as shown and described, for instance, in U.S. Pat. No. 3,077,176, dated Feb. 12, 1963, to David B. Pall et al, or a bellows.

The second magnetic means can be arranged to move reciprocably, as in a piston, or to rotate, as in a ball, for instance as in the device of U.S. Pat. No. 3,815,542. Accordingly, it also can be in the form of a piston. It can be arranged to project from the housing for the indicator, for a visual indication. It also can be arranged to actuate a switch, as in U.S. Pat. No. 3,077,854 to David B. Pall, dated Feb. 19, 1963, or to move an indicator, such as a pointer, or magnetic fibers, either directly or magnetically. The second magnetic means can also be a ball, carried in or on a ball.

The biasing means for the first and second pistons can take the form of a spring, such as a coil spring, a finger spring, a wave-form spring, a conical spring, or an annular disc spring, such as a Belleville spring. The biasing means can also be a third magnet, as disclosed in U.S. Pat. No. 3,140,690, to M. P. L. Siebel, in which case a spring can optionally be included or omitted.

The sampling port can be provided in any portion of the housing or housing portion in which the first and/or second magnetic means is disposed and is in fluid flow connection with one of the line connections leading to each side of the first magnetic means. Two sampling ports can be provided, one in fluid flow connection to one line connection, and one to the other. One or more through bores can be drilled in or cut out of the housing or molded into the housing tapping the fluid line connection at one end, or a passage leading to it, and extending to the outside of the housing at the other end. These can be only partially drilled or cut out, and the remainder knocked out, to open as many ports to whichever fluid lines are to be tapped, as may be desired.

The open ports are closed off by sampling plugs, which are removed to tap the line. Any design of sampling plug can be used, held to the housing in a readily removable manner, such as by threads, a bayonet joint, a clamp, or a pin.

The sampling port can also be provided with a sampling valve, such as a ball, poppet, umbrella, or plunger type of valve. One preferred form of valve is illustrated in the drawings.

The drawings illustrate preferred embodiments of the invention.

Figure 2:
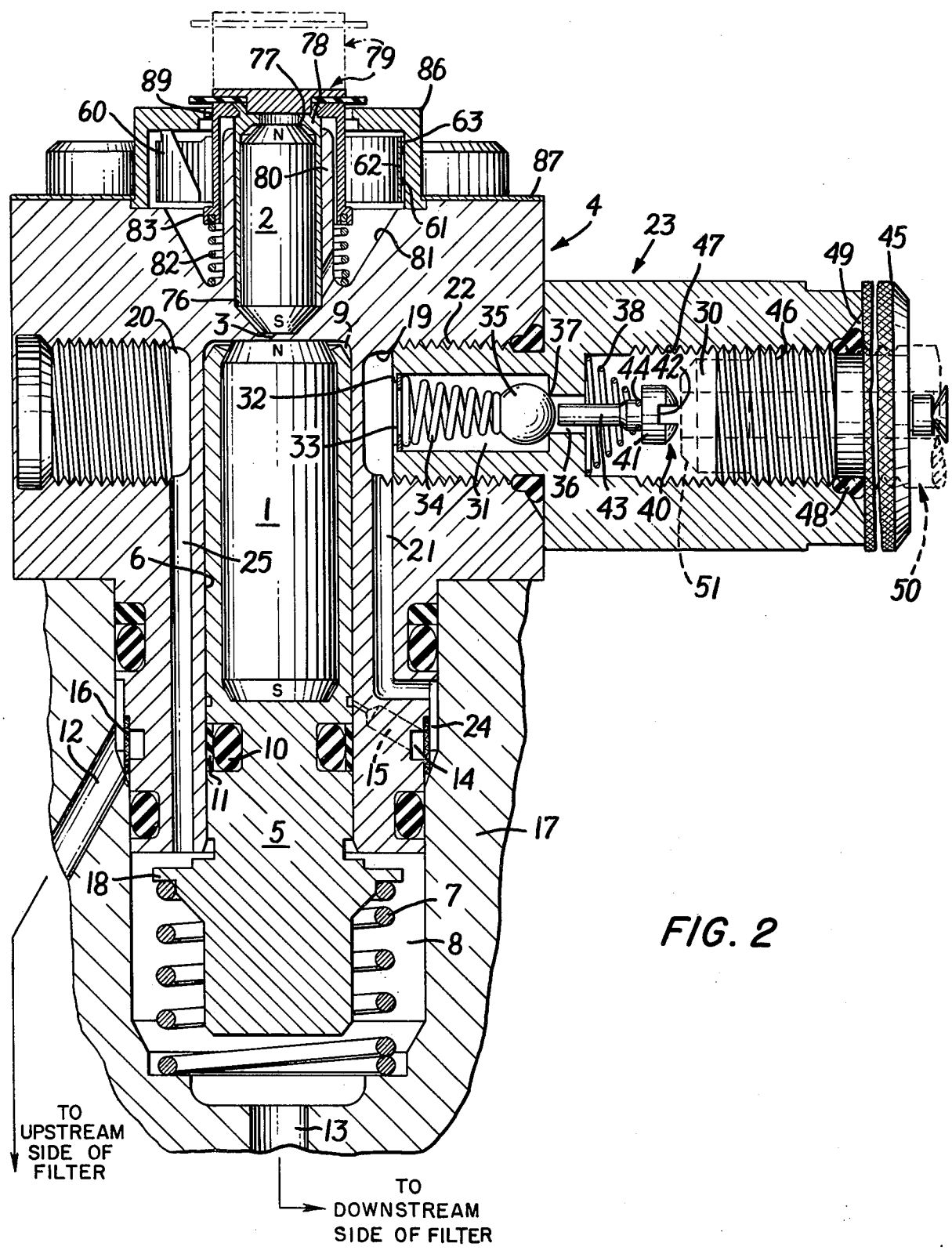

FIG. 1 is a top view of a typical pressure indicator according to the invention, in which the sampling plug and port project from the housing within which the device is disposed; and FIG. 2 is a view in longitudinal section taken through the pressure indicator of FIG. 1.

The pressure indicator of the Figures comprises first and second magnetic elements 1 and 2, respectively, coaxially mounted on opposite sides of a separating wall or keeper 3 of magnetic material within a housing 4, which may be either of magnetic or nonmagnetic material. Elements 1 and 2 are positioned adjacent the wall or keeper 3, with magnetic poles opposed, so that each is drawn toward the wall by the resulting force of magnetic attraction therebetween. Preferably, the magnetic elements 1 and 2 are composed of permanently magnetized metal, such as Alnico VI, Alnico VIII, or ceramic magnetic material, or the like. If desired, however, element 2 may be formed of a suitable magnetic material such as iron, for example. Wall 3 is formed of a suitable magnetic material such as iron, for example, but it can also be of nonmagnetic material.

Mounted in a piston 5, magnetic element 1 and piston 5 are slidably supported in a cylindrical bore 6 in the housing 4, and are urged toward the wall or keeper 3 via bias means 7 which, in this embodiment, is a coil compression spring. The piston 5 and magnetic element 1 can also be all in one piece, of magnetic material. In order to prevent fluid from passing from the chamber 8 at the outer end of the bore 6 to the space 9 at the inner end, a liquid-tight seal is provided between bore 6 and the piston 5 by an O-ring 10 and ring 11, of Teflon or other suitable gasketing material. The seal may also be effected by close tolerances between the piston and bore, and the sealing rings omitted. The coil spring 7 is selected according to the desired actuating pressure to permit the piston 5 to move away from wall 3 in the bore 6 whenever the pressure at that end of the piston 5 exceeds the pressure at the other end by an amount equal to the actuating differential pressure.

In this embodiment of the invention, the pressure indicator is arranged to measure the pressure drop across a pressure-influencing component, such as a filter (not shown, but illustrated in U.S. Pat. No. 2,942,572). Thus, fluid under pressure is applied to the component such as a filter via an inlet line (not shown) and emerges on the other side of the component through an outlet line (not shown). The bore 12 in the cap 17 is in fluid-flow connection with the filter inlet line on the upstream side of the filter, and communicates fluid pressure in the inlet line via circumferential groove 14, and bore 15, in the housing 4, to the space 9 at the inner side of the piston 5, while the chamber 8 at the other end of the piston 5 is in fluid pressure communication with the outlet line on the downstream side of the filter via bore 13. The difference in pressure between the inlet and outlet lines is a measure of the pressure drop across and therefore the clogging of the filter or other pressure-influencing component, and the different pressures are thus communicated to opposite sides of the piston 5.

If desired, in order to prevent dirt carried by the incoming fluid on the upstream side of the filter from blocking the bore 15 and/or bore 6 and space 9, possibly obstructing movement of the piston, a suitable annular filter element 16, of sintered wire mesh, for example, is inserted over the outside of the housing 4, across the inner end of bore 12, in the line of flow to groove 14.

For ease in assembling of the piston 5, the bore 6 has its open end closed off by the cap 17, and the base of the spring 7 is retained by the cap against the abutment 18 of piston 5. The cap is permanently retained to the housing 4. The spring can also be retained by the housing in which the indicator is installed, in which event the cap can be omitted.

Drilled into the housing 4 are two sampling bores 19, 20. Bore 19 at its inner end is in fluid-flow connection with a bore 21, extending parallel to bore 6 and opening into groove 24, which is in the fluid flow connection with the inlet line upstream of the filter 16 via bore 12. The bore 19 is provided with internal threads 22, into which is threaded a sampling plug 23, arranged to make it possible to withdraw fluid from the upstream line by way of bore 19. Bore 20 as shown is closed off, and not in use.

The sampling plug 23 has a through central passage 30. The inner end of the passage 30 has a reduced portion 31 with a reentrant portion 32 at the outlet 33. Seated against the inside face of the reentrant portion is a coil compression spring 34, bearing a poppet ball 35 at the other end. A constriction 36 in the passage 30 provides a valve seat 37, against which the ball 35 is normally biased in a leak-tight seal by the spring 34, thus closing off the central passage 30 of the sampling plug 23.

On the other side of the contruction 36 in passage 30 is seated a coil spring 38, also of the compression type, carrying a valve actuator 40. The valve actuator includes a heat 41 provided with a groove 42 and a stem 43. The head end of spring 38 is held against the inner face of the head 41 on the groove 44 of the stem 43. Movement of the actuator 40 against the spring 38 through the passage 36, so that the end of stem 43 is thrust against the poppet 35, moves the poppet inwardly, away from the valve seat 37, opening passage 36 and the central passage 30 to flow of fluid from the bore 21. Normally, however, the valve actuator 40 is held in the inactive position as shown in FIGS. 1 and 2 by the spring 38, and the valve is closed.

The sampling plug is provided with a cap 45 having a threaded stem 46, which threads into the internal threads 47 at the outer end of the central passage 30. A V-ring (or O-ring) seal 48 is captured between the cap 45 and the inlet end 49 of the passage, sealing off the outer end of the passage 30 when the plug is threaded tightly down on the threads. The sampling plug is accordingly closed off at two places, valve 35 and cap 45.

Upon removal of the cap however, the valve actuator 40 becomes accessible. Insertion of a threaded flared cone fitting 50 (shown in dashed lines) into the inlet end 49 of the passage 30, on the internal threads of the passage, brings the rim of the conical tip 51 into contact with the periphery of the head 41 on the valve actuator 40. As the tip 51 of the flared cone 50 continues to be moved inwardly, the valve actuator 40 is pushed inwardly. Eventually, the stem 43 contacts and opens the valve 35 by moving the ball inwardly. Fluid then runs via groove 42 into the interior of the cone and emerges from the sampling plug 23. The extend of inward movement of the flared cone 50 determines the degree of opening of the valve, according to corresponding inward movement of the valve actuator. Thus, any desired degree of opening can be obtained, for slow or rapid fluid flow and sampling of a predetermined volume of fluid, as desired. Following the sampling, the flared cone 50 can be removed and the cap 45 reinstalled.

The device shown in FIGS. 1 and 2 can easily be modified to include two sampling plugs, one to sample upstream and one to sample downstream fluid. This is done by opening up port 20 and inserting a sampling plug identical to that shown in FIGS. 1 and 2, arranged for sampling the downstream fluid via bores 13 and 12. The inner end of bore 20 is in fluid flow connection with bore 25, which in turn opens into bore 6 at chamber 8.

Alternatively, sampling plug 23 can be inserted in bore 20 instead of bore 19, leaving bore 19 closed off, and thus sampling downstream fluid only.

Accordingly, either upstream or downstream fluid or both can be sampled, in the manner described for FIGS. 1 and 2.

The wall or keeper 3 is an integral part of the housing 4; but it may be press-fitted in a leak-tight fit at the upper end of second bore 76 of the housing 4. The bore 76 is coaxial with the bore 6, but it need not be. Secured to the skirt end 77 of the magnetic element 2 by an annular skirt 78 is a cap 79 which extends over the exterior of the cylindrical projection 80 of the housing 4, defining the bore 76 therewithin. The skirt 78 is swaged onto the cap. Within an annular recess 81 in the housing 4, surrounding projection 80, is a second bias means 82 which, in this embodiment, is a compression coil spring which extends from the inner face of the cap within the flange 83 to the housing at the base of the recess 81, and urges the cap 79 and the magnetic element 2 to which it is attached away from the wall 3. This spring is selected so that it is retained in the stressed condition while the magnetic element 2 is held against the wall or keeper 3 by the attractive force between the magnetic elements 1 and 2, or between element 2 and keeper 3; this attractive force between these elements is sufficient, so long as the adjacent poles of the magnetic elements 1 and 2 are separated by less than a predetermined distance, for example, one-sixteenth of an inch. Whenever the magnetic element 1 is moved away from the element 2 so that their adjacent poles are separated by more than one-sixteenth of an inch, however, the decreased force of magnetic attraction resulting therefrom is overcome by the force of the spring 82, and the cap 79 and element 2 are driven away from the wall 3.

In order to prevent the cap 79 and magnetic element 2 from being driven completely out of the bore 76 upon actuation, the open end of the annular recess 81 is closed off by an annular cover 86, retained there by a cover plate 87, snugly held to the housing 4. The inner periphery 89 of the cover closely abuts, but does not touch, the cap 79. The flange 83 (which retains the spring 82) engages the cover 86 whenever the cap is thrust outwardly by the spring, thereby preventing the cap from preceeding further than the dashed-line position shown in FIG. 2.

A conventional bimetallic element 60 is attached to the cover 86 at welds 61, and extends around the cap 79. The bimetallic element 60 is preferably comprised of two arcuate inner and outer strip portions 62, 63 joined together, for example by a weld, and both arranged to bend inwardly upon contraction with decreasing temperatures. At normal temperatures, element 60 has a minimum radius greater than that of the flange 83, and permits the cap 79 to ride through the aperture therebetween on actuation. However, at temperatures below a preselected value, at which for example the fluid to be filtered increases appreciably in viscosity, for example 33° F to 62° F, the element 60 contracts inwardly, so that the inner strip 62 extends over the face of the cap 79 just above and within the flange 83, thus engaging the flange, and preventing actuation of the pressure indicator.

In operation, fluid pressure in the inlet line is communicated via the duct 12 to the space 9 of the cylindrical bore 6, urging the magnetic element 1 and piston 5 away from wall 3 against the force of the spring 7 and the pressure from the outlet line, communicated to space 8 via port 13. Whenever the difference between the inlet and outlet pressures is greater than the force of the spring 7, the piston 5 is driven away from wall 3 in the bore 6. After the magnetic element 1 is moved to a position more than approximately one-sixteenth of an inch away from the magnetic element 2, the attractive force therebetween is less than the force of the spring 82, and the magnetic element 2 is driven away from the wall 3 until the cap 79 (which if desired, may be of a suitable eye-catching color, such as red, orange or yellow) emerges and projects through the aperture 64, and the flange 83 abuts the inside surface of the cover 86, where it is held firmly by the spring 82, in the dashed-line position shown in FIG. 2.

The cap 79 in this position indicates that the pressure difference is greater than the predetermined value in accordance with which the spring 7 has been selected. As an example, the spring 7 may be arranged to permit the magnetic element 1 to be driven away from the wall 3 whenever the pressure difference exceeds 35 psi, and thus give a signal.

If the magnetic element 2 be pushed inwardly, while the magnetic element 1 is away from wall 3, the magnetic element 2 is not attracted to the wall or keeper 3 by a force greater than the biasing force of spring 82, and can be held in this position only while it is retained there manually. As soon as the manual force is removed, the piston returns to the indicating position shown in FIG. 2 under the force of the spring 22. However, if magnetic element 1 is in the normal position shown in FIG. 2, it will be held there, and the device is then ready for reactuation under the predetermined pressure differential.

At temperatures below 32° F, for example, the thermostatic element 60 contracts, to move the inner face 62 of the strip 60 over the cap 79 to engage the flange 83. Thus, when the piston and the magnetic element 2 seek to move away from the wall 3 under a differential pressure exceeding the biasing force of spring 7, resulting from increased viscosity of the fluid, the inner edge of the strip 60 intercepts the flange 83, preventing a false indication of, for example, filter clogging.

If desired, this pressure indicator may be utilized to indicate a total pressure above atmospheric instead of a pressure differential, by communicating port 13 opening to space 8 of bore 6 to the atmosphere. Similarly, an absolute pressure may be indicated by connecting the port 13 and space 8 of bore 6 to a vacuum.

In the embodiments shown in the drawings, the magnetic elements 1 and 2 are arranged so as to attract each other, with opposed poles. An equivalent result can be obtained by arranging the elements 1 and 2 so as to be mutually repelling, with like poles facing each other. This requires only a small modification of the structure shown, that would be obvious to anyone skilled in this art with a knowledge of magnetic principles, using the principles of this invention as discussed above.

In the embodiment shown in FIGS. 1 and 2, the magnetic element 1 can be reversed, so that the south pole faces the south pole of magnetic element 2, and the element 1 relocated so that it is at the opposite end of the bore, in its normal position, with the spring 7 relocated to the opposite side of the piston, to bias it in the opposite direction. The pressure-sensing line connections 12 and 13 also have to be reversed, so that outlet line pressure is sensed via bore 12 and inlet line pressure sensed via port 13. Now, a pressure differential sensed by the piston 1 via bore 12 and port 13 tends to move the piston towards wall 3, repels magnetic element 2 away from wall 3, and eventually to an actuating position. In this type of embodiment, of course, elements 1 and 2 must both be magnets, unless wall 3 is a magnet of opposite polarity instead of element 2.

It will be understood that the devices shown are designed so that the higher pressure of the two pressures being sensed is communicated to the piston 1 via bore 12. When the magnetic elements are repelling, the higher pressure is communicated to the piston 1 via port 13.

The sampling ports can also be included in the housings of other types of magnetic pressure indicators, such as any of those of U.S. Pat. Nos. 2,942,572, 3,077,176, 3,140,690, 3,785,332 and 3,815,542.

The terms "react with" and "reaction with" as used in the claims refer to the forces of magnetic attraction or repulsion between the first and second magnetic means. The first magnetic means is spaced from and arranged to attract or repel and thereby react with the second magnetic means, so long as the two means are within the mutually reactive magnetic fields of force. The term "magnetic means" encompasses both magnets and magnetically attracted materials, and it will be understood that a keeper can be interposed therebetween, and that the keeper can be of magnetic or non-magnetic material.

Having regard to the foregoing disclosure, the following is claimed as the inventive and patentable embodiments thereof:

1. A magnetic pressure indicator providing for sampling of fluid without interfering with actuation of the device, comprising a housing and, disposed in combination in the housing, a first magnetic means in one chamber spaced from and arranged to react with a second magnetic means in a second chamber so long as the two magnetic means are within their mutual magnetic fields of force; first bias means to retain the first magnetic means towards or away from the second magnetic means; second bias means to propel the second magnetic means from a first position to an indicating position whenever the spacing distance between the two magnetic means is changed; the first magnetic means being movable in response to changes in pressure, and normally resiliently biased by the first bias means toward or away from the second magnetic means by a predetermined force, and the second magnetic means being normally resiliently biased by the second bias means in a direction away from the first means by a force capable of overcoming the force of magnetic reaction with the first magnetic means whenever the first and second magnetic means are spaced by a predetermined distance; at least two fluid line connections, one connection leading to said first chamber having the first magnetic means and the other connection leading to said first chamber on the other side of the first magnetic means, pressure in said line connections tending to move the first magnetic means in opposite directions; at least one sampling port in fluid flow connection with one of the fluid line connections; and valve means in the housing connected across the fluid flow connection from the sampling port to the other fluid line connection and selectively movable between open and closed positions, normally closing off the port, and accessible from outside the indicator to be activated for movement to an open position for removing a fluid sample via the port.

2. A magnetic pressure indicator according to claim 1, in which the second magnetic means is in the form of a piston.

3. A magnetic pressure indicator according to claim 1, in which the second magnetic means is a piston of high surface area.

4. A magnetic pressure indicator according to claim 1, in which at least one of the first and second bias means is a spring.

5. A magnetic pressure indicator according to claim 1, having plug means removably attached across the sampling port in a manner to close it off and upon removal giving access to the valve means.

6. A magnetic pressure indicator according to claim 1, having two sampling ports, one in the fluid flow connection with said one of the fluid line connections, and another in fluid flow connection with another fluid line connection.

7. A magnetic pressure indicator according to claim 6, having said one fluid line connection arranged for connection upstream and the other fluid line connection arranged for connection downstream of a filter.

8. A magnetic pressure indicator according to claim 1, in which the valve comprises a poppet valve spring-biased against a valve seat and movable against the spring bias into an open position for release of fluid from the line.

9. A magnetic pressure indicator according to claim 1, in which the valve is actuated by a flared cone having an open interior and arranged to pass fluid via its interior when the valve is open for sampling.

10. A magnetic pressure indicator according to claim 1, having a bimetallic means arranged to prevent movement of at least one of the first and second magnetic means at temperatures below a predetermined minimum.

11. A magnetic pressure indicator according to claim 1, in which both the first and second magnetic means are magnets.

12. A magnetic pressure indicator according to claim 1, in which one of the first and second magnetic means is a magnet, and one is of magnetizable material.

13. A magnetic pressure indicator according to claim 1, in which the first and second magnetic means are separated by a wall, both of the magnetic means are of magnetizable material, and the wall is a magnet.

14. A magnetic pressure indicator according to claim 1, in which one of the first and second magnetic means is a magnet and the wall is a magnet.

15. A magnetic pressure indicator according to claim 1, in which the first and second magnetic means are mutually attracting.

16. A magnetic pressure indicator according to claim 1, in which the first and second magnetic means are mutually repelling.

17. A magnetic pressure indicator according to claim 1, in which the first magnetic means is spaced from and arranged to attract the second magnetic means, and the first bias means is arranged to retain the first magnetic means in a position toward the second magnetic means.

18. A magnetic pressure indicator according to claim 1, in which the first magnetic means is spaced from and arranged to repel the second magnetic means, and the first bias means is arranged to retain the first magnetic means in a first position away from the second magnetic means.

19. A magnetic pressure indicator according to claim 1, in which the first and second magnetic means are each spaced from and arranged to attract a keeper, and the first bias means is adapted to retain the first magnetic means in a first position towards the keeper, while the second bias means is adapted to propel the second magnetic means away from the keeper.

20. A magnetic pressure indicator according to claim 1, in which the first magnetic means is spaced from and arranged to repel a keeper, and the first bias means is arranged to retain the first magnetic means in a first position away from the keeper, while the second magnetic means is arranged to attract the keeper, and the second bias means is adapted to propel the second magnetic means away from the keeper.

* * * * *

UNITED STATES PATENT OFFICE
CERTIFICATE OF CORRECTION

Patent No. 4,026,153　　　　　　　　　　Dated May 31, 1977

Inventor(s) Bernard F. Silverwater

It is certified that error appears in the above-identified patent and that said Letters Patent are hereby corrected as shown below:

Column 1, line 40　　:　　"though" should be --through--.
Column 1, line 55　　:　　"said" should be --and--
Column 6, line 5　　:　　"construction" should be --constriction--
Column 6, line 8　　:　　"heat" should be --head--
Column 7, line 32　　:　　"preceeding" should be --proceeding--

Signed and Sealed this

Eighth Day of November 1977

[SEAL]

Attest:

RUTH C. MASON　　　　　　LUTRELLE F. PARKER
Attesting Officer　　　Acting Commissioner of Patents and Trademarks